United States Patent [19]

Zhang

[11] Patent Number: 5,501,644
[45] Date of Patent: Mar. 26, 1996

[54] METHOD AND ARRANGEMENT FOR ACTUATING AN AUTOMATIC TRANSMISSION

[75] Inventor: Hong Zhang, Schwieberdingen, Germany

[73] Assignee: Robert Bosch GmbH, Stuttgart, Germany

[21] Appl. No.: 299,446

[22] Filed: Sep. 1, 1994

[30] Foreign Application Priority Data

Sep. 4, 1993 [DE] Germany .......................... 43 29 978.4

[51] Int. Cl.[6] ................................................... B60K 41/04
[52] U.S. Cl. ............................................................ 477/97
[58] Field of Search ........................................ 477/97, 98

[56] References Cited

U.S. PATENT DOCUMENTS

| | | | |
|---|---|---|---|
| 4,972,737 | 11/1990 | Makimoto | 477/98 |
| 5,069,084 | 12/1991 | Matsuno et al. | 477/98 |
| 5,131,293 | 7/1992 | Kaiser et al. | 477/98 |
| 5,157,991 | 10/1992 | Sumimoto | 477/98 |
| 5,199,326 | 4/1993 | Iwatsuki et al. | 477/98 |
| 5,275,069 | 1/1994 | Baba et al. | 477/98 |
| 5,325,740 | 7/1994 | Zhang et al. | 477/110 |
| 5,345,843 | 9/1994 | Fujita et al. | 477/98 |
| 5,428,531 | 6/1995 | Hayafune | 477/97 |

FOREIGN PATENT DOCUMENTS

2271198  4/1994  United Kingdom .

Primary Examiner—Dirk Wright
Attorney, Agent, or Firm—Walter Ottesen

[57] ABSTRACT

The invention is directed to an arrangement for actuating an automatic transmission of a motor vehicle which is equipped with a drive unit wherein fuel is consumed. The transmission ratios are then so adjusted that the drive unit is driven in its operating range wherein consumption is optimal. The adjustment of the transmission ratio takes place in dependence upon at least a first signal (n_ab) representing the transmission output rpm and/or the engine rpm and/or the transmission input rpm. Furthermore, the adjustment of the transmission ratio is dependent upon a second signal (mo_ab) which represents a desired value for the torque outputted by the transmission. The adjustment of the transmission ratio then takes place with the aid of a comparison of the first signal and/or the second signal to at least one threshold value (mo_ab_stst). According to the invention, the one threshold value is at least dependent upon parameters which influence the maximum torque to be outputted by the drive unit to the transmission.

11 Claims, 3 Drawing Sheets

METHOD AND ARRANGEMENT FOR ACTUATING AN AUTOMATIC TRANSMISSION

FIELD OF THE INVENTION

The invention relates to a method and an arrangement for actuating an automatic transmission of a motor vehicle.

BACKGROUND OF THE INVENTION

A method for operating a drive unit which includes an internal combustion engine and an automatic transmission is disclosed in U.S. patent application Ser. No. 08/050,085, filed Apr. 28, 1993, now abandoned. The drive unit is especially for motor vehicles. A drive torque is made available at the output of the transmission in dependence upon several parameters and is based on an engine torque and an engaged gear of the transmission. The driver actuates the accelerator pedal and thereby presets a desired value for the output torque independently of the gear engaged. The adjustment of the transmission ratio is achieved in that the engine is driven in its operating range wherein consumption is optimal. The engine torque is then adjusted independently of the gear which has been engaged so that the desired value for the output torque at the transmission is maintained insofar as the maximum available engine torque is adequate. The desired value is determined from the position of the accelerator pedal and, if required, from additional parameters. It is additionally provided that the transmission is driven at a high ratio while utilizing the maximum engine torque. For this reason, the engine is in its range wherein consumption is optimal. Only when the engine torque, which is required for the highest ratio, is above the maximum torque of the engine, then, generally, a lower ratio is adjusted via a threshold comparison.

A desired value for the engine torque is computed in a simple manner while considering the converter amplification in U.S. Pat. No. 5,325,740 which proceeds from the subject matter of the above-mentioned U.S. patent application Ser. No. 08/050,085. In this way, at the time point of the computation of the required engine torque, the converter amplification can already be considered which adjusts at the computed engine torque. The power determining parameters of the engine can thereby be adapted to the future requirements in correspondence to the driver command. This makes it possible to precisely provide the output desired torque in correspondence with the driver command.

Furthermore, U.S. patent application Ser. No. 08/069,060, filed Jun. 1, 1993, still pending, discloses considering lost torque of the drive unit in the above-mentioned method.

With the state of the art mentioned above, it is intended that the shift points of the transmission can be placed in consumption-optimal ranges with the aid of the so-called master shift function without it being necessary to suffer loss with respect to sportability and the capability of metering of tractive force. The consumption-optimal ranges correspond mostly to the full load boundary of the engine with the air/fuel ratio lambda=1 being maintained for exhaust-gas emission reasons. That means, however, that the shift points must be so placed that, in advance of each downshift, the engine should first be brought to its maximum engine torque in order to save fuel.

SUMMARY OF THE INVENTION

It is an object of the invention to optimize the shift points in a system of the kind described above.

In the state of the art, the maximum engine torque is measured in dependence upon the engine rpm at a specific intake air temperature and a specific atmospheric pressure without external consumers (for example, air conditioning). For this reason, the shift points, which correspond to the maximum engine torque, cause, for changed environmental conditions, either an interruption in the tractive force between the engine and the drive wheels in advance of the downshifting (for example, at low atmospheric pressure or high air temperature) or the shift points lead to consumption advantages which are not utilized (for example, at high atmospheric pressure or low air temperature). The shift points must therefore be corrected in dependence upon environmental conditions in order to always obtain consumption-optimal ranges for various environmental conditions without causing interruptions in tractive force.

The invention proceeds then from a system for actuating an automatic transmission of a motor vehicle which is equipped with a drive unit wherein fuel is consumed. The transmission ratios are so adjusted that the drive unit is operated in its consumption-optimal operating range. The adjustment of the transmission ratio then takes place in dependence upon at least a first signal representing the transmission output rpm and/or the engine rpm and/or the transmission input rpm. Furthermore, the adjustment of the transmission ratio is dependent upon a second signal which represents a desired value for the torque outputted by the transmission.

The adjustment of the transmission ratio takes place with the aid of a comparison of the first signal and/or the second signal with at least one threshold value.

According to the invention, the one threshold value is at least dependent on parameters which influence the torque to be outputted maximally by the drive unit to the transmission.

As mentioned above, this affords the advantage that the consumption-optimal ranges of the engine can be optimally utilized with the aid of the recognition of the particular applicable maximum engine torque.

It is especially advantageous that, as parameters, those parameters are used which act upon the maximum torque to be outputted by the drive unit to the transmission. These parameters include: the lost power of the drive unit and/or the ambient air pressure (atmospheric pressure) and/or the temperature of the air drawn in by the drive unit in the case wherein an internal combustion engine is used as the drive unit and/or the load taken up by the drive unit of an external consumer such as an air conditioner. In this way, the engine torque can be determined which is the maximum under the particular operating conditions so that the motor can be operated in its consumption-optimal range.

Furthermore, it is advantageous that, for the threshold value comparison, the second signal, which represents the transmission output desired torque, is compared to a threshold which, in addition to the above-mentioned parameters, is dependent upon the first signal which represents the instantaneous transmission output rpm and/or the engine rpm and/or the transmission input rpm. This embodiment has the background that, in accordance with the state of the art, the shift characteristic lines, as a rule, are determined while considering the maximum motor torque at various motor rpms and are then applied. These basic shift characteristic lines are adapted, in accordance with the invention, to a changed maximum motor torque which, in turn, is changed by the above-mentioned parameters.

The first signal representing the transmission output torque is, in general, pregiven by the driver of the motor vehicle via an accelerator pedal.

The threshold value comparison is so dimensioned that a transition to a lower gear of the transmission (downshift operation) is triggered when the second signal, which represents the transmission output torque desired value, exceeds the threshold representing the maximum transmission output torque. Furthermore, it is generally provided that the adjusted transmission ratio remains unchanged when the second signal representing the transmission output torque desired value exceeds the threshold representing the maximum transmission output torque. The adjusted transmission ratio then remains unchanged until the second signal, which represents the transmission output torque desired value, exceeds a threshold, which represents the maximum transmission output torque for the next higher gear. An upshift is triggered when this threshold is reached.

In addition to the method, the invention also relates to an arrangement for carrying out the above-mentioned method.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
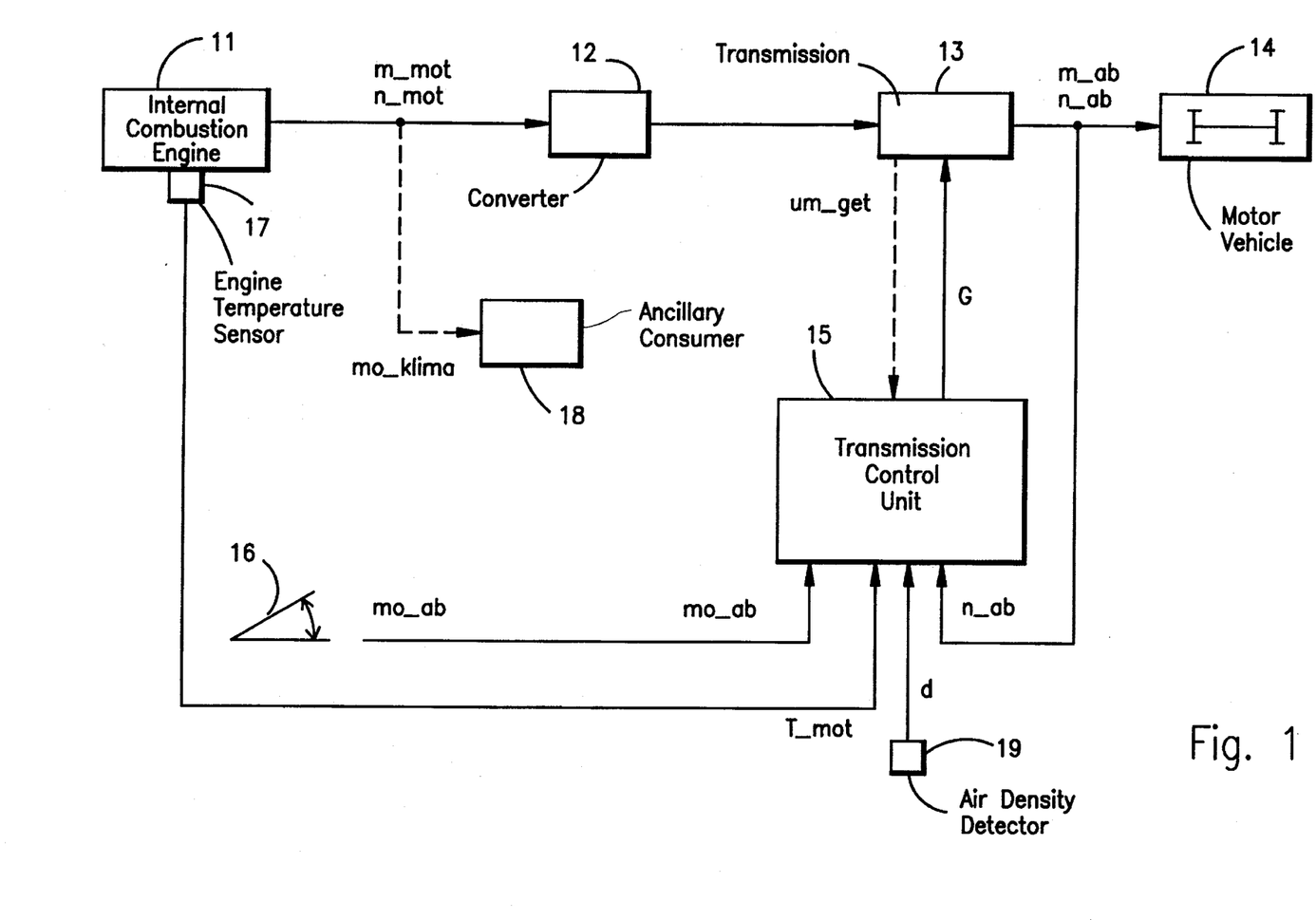
FIG. 1 shows a block circuit diagram showing an embodiment of the overall system which is the basis of the applicant's invention.

Referring to FIG. 1, reference numeral 11 identifies an internal combustion engine presented as a drive unit. The engine 11 supplies an engine output rpm n_mot and an engine output torque m_mot at its output end. These variables are applied to the converter 12 corresponding to the automatic transmission 13 insofar as no ancillary consumer 18 is applied as a load m_klima to the drive unit 11. The transmission output rpm n_ab and the transmission output torque m_ab are present at the output end of the transmission 13. The transmission output then acts on the motor vehicle 14 via the drive wheels of the vehicle. The driver presents a desired value mo_ab for the transmission output torque which is supplied to the transmission control 15. Furthermore, the transmission output rpm n_ab, the engine temperature T_mot from temperature sensor 17 and the ambient air density d from the detection means 19 are supplied to the transmission control unit 15. The transmission control unit 15 controls the ratio um_get of the transmission 13 via the signal G in dependence upon these input signals and in dependence upon the stored vehicle parameters (open-loop control or closed-loop control).

As mentioned in the evaluation of the state of the art referred to above (U.S. Pat. No. 5,325,740 and U.S. patent application Ser. No. 08/050,085, filed Apr. 28, 1993), an output (transmission output torque desired value) desired value mo_ab (proportional to the tractive force) is computed in dependence upon accelerator pedal position for the instantaneous output rpm n_ab (proportional to the road speed of the vehicle).

In a characteristic field, the term $$g\_opt\ (mo\_ab,\ n\_ab)$$

determines the optimal gear g_opt which is computed for each state (defined by n_ab and mo_ab) at the output shaft pursuant to specific optimization criteria. If the optimal gear g_opt deviates from the gear g_act which has just been engaged, then the transmission control unit 15 shifts into the gear g_opt insofar as no boundary conditions such as maintaining a shift hysteresis and the like are contrary thereto.

With respect to optimal consumption, the support points are computed from mo_ab in the characteristic curve g_opt-(mo_ab, n_ab) for determining the downshift mostly from the full-load line mo_kup_max(n_mot) of the motor 11. An engaged converter clutch is assumed here. The support points are specific points which are stored in memory and form the basis of the characteristic curve. Values which lie between each two support points are determined by interpolation so that the characteristic curve is defined by the support points and interpolation of values therebetween. This enables space to be saved in memory.

In the following, motor variables which are measured for a specific intake air temperature Tans0 and a specific atmospheric pressure Pa0 and without external load (such as a climate control unit as a consumer) are provided with a zero (0).

As support points mo_ab_stst of this characteristic, the following result:

$$mo\_ab\_stst0 = um\_get * mo\_kup\_max0(n\_ab * um\_get) \qquad (1)$$

wherein $$mo\_kup\_max0 = mo\_ind\_max0 - mo\_ver10$$

wherein:

mo_ind_max0 is the maximum indicated motor torque, that is, the maximum obtainable motor torque; and, mo_ver10 is the lost torque of the motor.

That is, the highest gear g_opt is selected in dependence upon the output rpm n_ab when there is a specific drive torque command pregiven by the driver by actuating the accelerator pedal 16 as long as the following condition is satisfied:

$$mo\_ab < mo\_ab\_stst0(g\_opt) \qquad (2)$$

If the equation (2) is no longer satisfied, then the next higher gear is selected.

The full-load characteristic line mo_kup_max0 is measured at a specific intake air temperature Tans0 and a specific atmospheric pressure Pa0 and without external load (such as a climate control unit as consumer). During real operation, the intake air temperature Tans and the atmospheric pressure Pa change, however. For this reason, the density of the air drawn in by suction by the internal combustion engine changes. Furthermore, an ancillary consumer 18 such as a climate control unit can be connected which requires a motor torque mo_klima. The new output torque support location then is defined by:

$$mo\_ab\_stst = um\_get * mo\_kup\_max(n\_ab * um\_get) \qquad (3)$$

wherein:

$$mo\_kup\_max = mo\_ind\_max - mo\_verl - mo\_klima \qquad (4)$$

The maximum indicated motor torque mo_ind_max is determined by the maximum inflowing intake air mass depending upon the engine rpm. The maximum air-mass value is, in turn, proportional to the ambient air density d, that is:

$$[mo\_ind\_max/mo\_ind\_max0\ ] = f(ml\_max(n\_mot))/$$

$$f(ml\_max0(n\_mot)) \qquad (5)$$

$$ml\_max(n\_mot)/ml\_max0(n-mot)=d/d0 \qquad (6)$$

wherein: ml_max0(n_mot) is the maximum air-mass value at Tans0 and Pa0; d0 is the air density at Tans0 and Pa0; and, n_mot=n_ab*um_get.

The lost torque of the engine mo_verl and the torque consumption of ancillary equipment mo_klima can be estimated. This can, for example, be performed with appropriate characteristic fields.

U.S. patent application Ser. No. 08/069,060, filed Jun. 1, 1993, provides especially advantageous measures for determining the lost torque of the engine mo_verl and the torque consumption of ancillary equipment mo_klima. In this context, long-term changes and changes which are taking place slowly are considered in the area of the drive unit.

The maximum indicated engine torque mo_ind_max0 and the engine torque loss mo_ver10 as well as the maximum air-mass value ml_max0 corresponding thereto is measured in dependence upon the engine rpm at the air density d0 and is stored in different characteristic lines of the control apparatus 15.

The new output torque support point results from equations (1) to (6) as follows:

$$mo\_ab\_stst=mo\_ab\_stst0*F(d/d0) \qquad (7)$$

wherein: F(d/d0) is the factor dependent on air density.

The air density d is detected by sensor unit 19 (FIG. 1) and is supplied to the unit 15. The change of the air density d/d0 can be determined directly via an air-mass measuring load value detection system of the internal combustion engine (hot-wire or hot-film measuring devices known from the state of the art) or via the adaptive load correction in alpha/n/lambda-systems as presented in British patent publication 2,271,198.

The correction of the drive torque support point mo_ab_stst0 can be carried out in longer time intervals (for example, every second) because the air density generally changes only very slowly.

Since the engine efficiency at large loads is only slightly dependent upon air mass, the above equations (5) and (6) can be simplified to:

$$[mo\_ind\_max/mo\_ind\_max0]=1+[(d/d0)-1]*d\_mo\_ind\_max \qquad (8)$$

wherein d_mo_ind_max defines the change of the maximum indicated torque per relative change of the air density.

The factor F(d/dO) dependent upon the air density in equation (7) follows explicitly from equations (1) to (5) and (8):

$$F(d/d0) = \frac{1 + [(d/d0 - 1)* d\_mo\_ind\_max - mo\_verl - mo\_klima]/ mo\_ind\_max0}{1 - mo\_verl/mo\_ind\_max0} \qquad (9)$$

The variables mo_ind_max0 and d_mo_ind_max are stored in dependence upon the engine rpm n_mot=n_ab*um_get in each case as a characteristic line. The determination of the torque loss of the engine mo_verl and of the ancillary consumers mo_klima in dependence upon n_mot is, for example, described in U.S. patent application Ser. No. 08/069,060, filed Jun. 1, 1993, and incorporated herein by reference.

Figure 2:
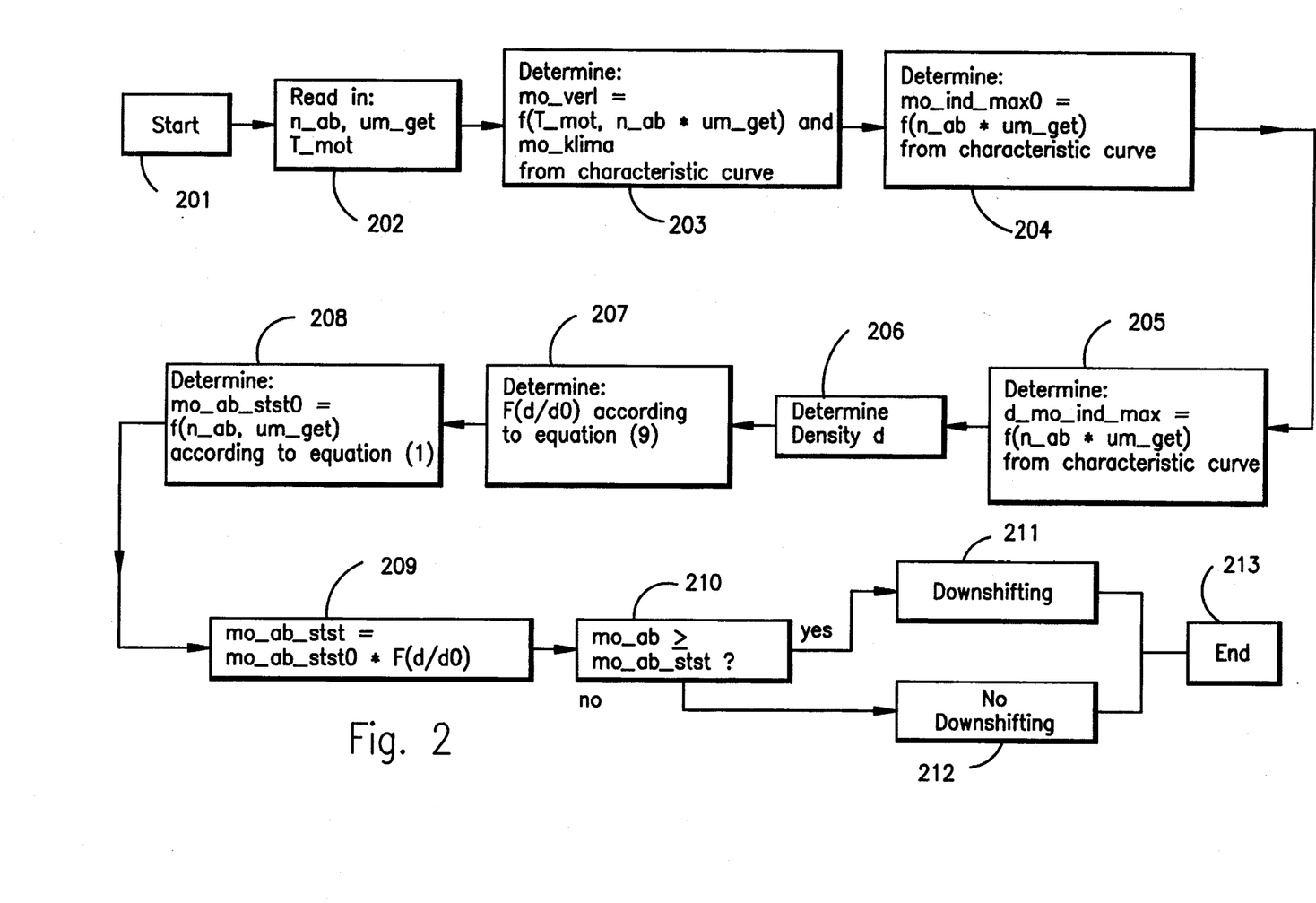
FIG. 2 is a block flow diagram showing the sequence of the steps of the method of the invention; and, FIG. 3 is a graph utilized in determining support points.

A sequence of steps of the method of the invention is shown in FIG. 2 and will now be described.

After the start 201 of the sequence, the variables n_ab, um_get and T_mot are read in in step 202 and indicate the transmission output rpm, the transmission ratio and the engine temperature, respectively. The torque loss of the engine mo_verl and the torque consumed by the ancillary equipment mo_klima are then determined in step 203. These torques can, as mentioned, be estimated with the aid of corresponding characteristic fields or they can be determined as described in U.S. patent application Ser. No. 08/069,060, filed Jun. 1, 1993.

In step 204, the maximum torque, which is to be developed by the engine, is determined. This torque is the indicated engine torque. This takes place, as already mentioned, on the basis of characteristic lines wherein the maximum indicated engine torque mo_ind_max0 at a specific intake air temperature Tans0 and a specific atmospheric pressure Pa0 and without external load such as a consumer in the form of climate control equipment is stored as a function of the transmission output rpm n_ab and the transmission ratio um_get.

In the next step 205, the change of the maximum indicated engine torque per relative change of air density d_mo_ind_max is determined. This variable is stored as a characteristic line in dependence upon the engine rpm n_mot= n_ab*um_get.

In step 206, the air density d or the change of the air density d/d0 is determined. This can take place directly via an air-mass measuring load value detection system of the internal combustion engine (hot-wire or hot-film measuring devices as known from the state of the art) or can be determined via the adaptive load correction in alpha/n/lambda-systems as disclosed in British patent publication 2,271,198.

The variable F(d/d0) can be determined in accordance with equation (9) in step 207 whereafter, in step 208, the support point mo_ab_stst0 of the full-load characteristic line is determined in accordance with equation (1) for the instantaneous transmission output rpm n_ab and the instantaneous transmission ratio um_get is determined without air pressure correction and without considering ancillary equipment.

In step 209, this support point is corrected, in accordance with equation (7) by the factor F(d/d0) determined in step 207, to support point mo_ab_stst of the full-load characteristic line for the instantaneous output rpm n_ab and the instantaneous transmission ratio um_get with the air pressure correction and by considering ancillary equipment. This corrected support point mo_ab_stst is compared as a threshold value in step 210 to the actual instantaneous command mo_ab of the driver. If the actual instantaneous command mo_ab is equal to or exceeds the threshold value (that is, the maximum torque to be developed by the engine at the transmission output), then downshifting takes place in step 211, that is, a lower ratio of the transmission is adjusted. If the actual torque command mo_ab drops below the threshold value (that is, the maximum torque to be developed by the engine at the transmission output), then the instantaneous ratio is maintained in step 212. The program starts again with step 201 after step 212.

The computation of the new shift points for the actual air density d will be explained in the following with respect to a downshift from third into the second transmission gear (3-2 shift).

From the output rpm support point n_ab_stst and the transmission ratio of the third gear um_get3, the corresponding engine rpms n_mot are computed. As described above, the variables mo_ind_max0, dmo_ind_max or mo_verl are determined from the corresponding characteristic lines. When an ancillary consumer is not switched on, then mo_klima is equal to zero in equation (9). From equation (9), the corrected support point results in accordance with steps 207, 208 and 209 as a comparison value to the actual driver command.

Figure 3:
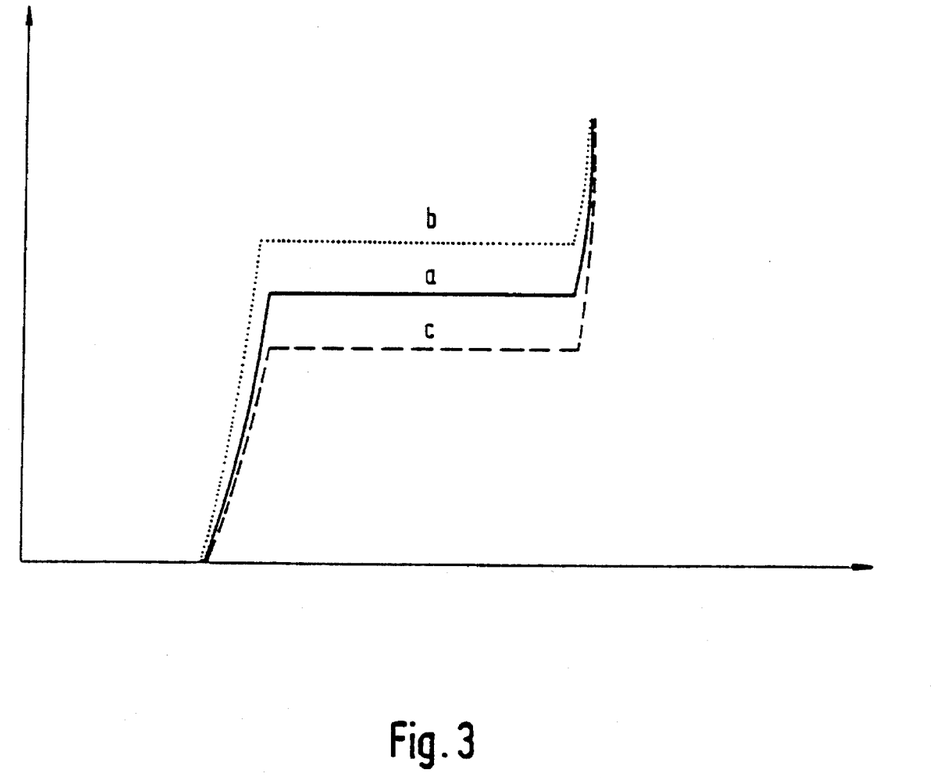

FIG. 3 shows the transmission output torque mo_ab commanded by the driver as a function of transmission output rpm n_ab. Using as an example a 3-2 downshift, the change of the shift characteristic lines is shown in FIG. 3 for the 3-2 transition with changes of air density. The shift characteristic line mo_ab_stst0 (n_ab) is indicated by curve (a) when the air density d assumes a pregiven value d0 because of a specific intake air temperature Tans0 and a specific atmospheric pressure Pa0. The transmission switches from the third gear back into the second gear with the desired output torque mo_ab>mo_ab_stst0.

The increase of air density (for example, with travel of a motor vehicle from a high elevation to lower elevation) effects an increase of the maximum obtainable engine torque. The factor F(d/d0) from equation (9) or step 207 is, in this case, greater than 1 and the newly calculated shift characteristic line (curve b in FIG. 3) is therefore above the shift characteristic line effective at the air density d0. The shift characteristic (curve b) is computed from equation (7) or in step 209. That is, the transmission downshifts only at a still greater output torque command (mo_ab≧mo_ab_stst>mo_ab_stst0).

The reduction of the air density (d) (for example, when driving at higher elevations) effects a drop of the maximum obtainable engine torque. The factor F(d/d0) of equation (9) or step 207 is, in this case, less than 1 and the shift characteristic curve, which is newly computed from equation (7) or in step 209, therefore runs below the shift characteristic line effective at the air density d0. That means that the transmission already shifts back at a lower output torque command.

Whereas the variables in this embodiment are essentially referred to the transmission output, it is also conceivable to refer these variables by means of the known transmission ratio to the transmission input or to the converter input (if required, also considering converter slip) without departing from the concept of the invention.

In accordance with the embodiment of the invention described, the shift characteristic lines of the transmission are corrected in dependence upon: the air density; the consumption by ancillary equipment; and, the change of the torque loss of the engine.

The foregoing then affords essentially the following two advantages. First, by correcting the output torque support point, no interruption in output torque arises in advance of the downshift in the case of the reduction of the maximum obtainable engine torque because of, for example, a low air density. Second, the consumption of fuel is reduced by utilizing the maximum obtainable engine torque in the case of an increased air density.

It is understood that the foregoing description is that of the preferred embodiments of the invention and that various changes and modifications may be made thereto without departing from the spirit and scope of the invention as defined in the appended claims.

What is claimed is:

1. A method of actuating an automatic transmission of a motor vehicle equipped with a drive unit consuming fuel, the method comprising the steps of:

providing a first signal (n_ab) representing the transmission output rpm and/or the motor rpm and/or the transmission input rpm;

providing a second signal (mo_ab) representing a desired value for the torque outputted by said transmission;

providing a threshold value (mo_ab_stst) which is at least dependent upon parameters (mo_verl, Pa, Tans, mo_klima) which influence the maximum torque (mo_kup_max) outputted by said drive unit to said transmission; and, adjusting the transmission ratio in dependence upon a comparison of at least one of said first signal (n_ab) and said second signal (mo_ab) to said threshold value (mo_ab_stst) thereby causing said drive unit to operate in an operating range which is optimal as to the consumption of fuel.

2. The method of claim 1, wherein said parameters include: the lost power (mo_verl) of the drive unit and/or the ambient air pressure (Pa) and/or the temperature (Tans) of the air drawn in by the drive unit in the case wherein an internal combustion engine is used as a drive unit and/or the load (mo_klima) taken up by the drive unit of an external consumer.

3. The method of claim 2, wherein said second signal (mo_ab) is compared to said threshold (mo_ab_stst); and, said threshold (mo_ab_stst) is dependent upon said first signal (n_ab) and said parameters (mo_verl, Pa, Tans, mo_klima).

4. The method of claim 1, wherein said second signal (mo_ab) is pregiven by the driver of the motor vehicle by an accelerator pedal.

5. The method of claim 1, wherein said second signal (mo_ab) is compared to a threshold value (mo_ab_stst) which is dependent upon the maximum torque to be developed by the drive unit.

6. The method of claim 1, wherein the comparison to said threshold value is so dimensioned that a transition to a lower gear of the transmission (downshift operation) is triggered when said second signal (mo_ab) exceeds the threshold value (mo_ab_stst) representing the maximum transmission output torque.

7. The method of claim 6, wherein the adjusted transmission ratio remains unchanged when said second signal (mo_ab) exceeds said threshold value representing the maximum transmission output torque.

8. The method of claim 7, wherein the adjusted transmission ratio then remains unchanged until said second signal (mo_ab) exceeds a threshold value, which represents the maximum transmission output torque for the next higher gear (g_opt+1).

9. The method of claim 1, wherein an inquiry is made as to said threshold value at selectable time intervals.

10. The method of claim 9, wherein said time intervals are in the order of magnitude of one second.

11. An arrangement for actuating an automatic transmission of a motor vehicle equipped with a drive unit consuming fuel, the arrangement comprising:

means for providing a first signal (n_ab) representing the transmission output rpm and/or the motor rpm and/or the transmission rpm;

means for providing a second signal (mo_ab) representing a desired value for the torque outputted by said transmission;

means for providing a threshold value (mo_ab_stst) which is at least dependent upon parameters (mo_verl, Pa, Tans, mo_klima) which influence the maximum torque (mo_kup_max) outputted by said drive unit to said transmission; and, means for adjusting the transmission ratio in dependence upon a comparison of at least one of said first signal (n_ab) and said second signal (mo_ab) to said threshold value (mo_ab_stst) thereby causing said drive unit to operate in an operating range which is optimal as to the consumption of fuel.

* * * * *

UNITED STATES PATENT AND TRADEMARK OFFICE
CERTIFICATE OF CORRECTION

PATENT NO. : 5,501,644

DATED : March 26, 1996

INVENTOR(S) : Hong Zhang

It is certified that error appears in the above-identified patent and that said Letters Patent is hereby corrected as shown below:

In column 1, line 48: delete "08/069,060" and substitute -- 08/069,606 -- therefor.

In column 2, line 32: between "the" and "torque", please insert -- maximum --.

In column 2, line 33: between "outputted" and "by", please delete "maximally".

In column 4, lines 28 and 33: please delete "mo_ver10" and substitute -- mo_ver10 -- therefor.

In column 5, line 3: please delete "max0(n-mot)" and substitute -- max0(n_mot) -- therefor.

In column 5, line 11: please delete "08/069,060" and substitute -- 08/069,606 -- therefor.

In column 5, line 18: please delete "mo_ver10" and substitute -- mo_ver10 -- therefor.

In column 5, line 19: please delete "is" and substitute -- are -- therefor.

In column 5, line 21: please delete "is" and substitute -- are -- therefor.

UNITED STATES PATENT AND TRADEMARK OFFICE
CERTIFICATE OF CORRECTION

PATENT NO. : 5,501,644

DATED : March 26, 1996

INVENTOR(S) : Hong Zhang

It is certified that error appears in the above-identified patent and that said Letters Patent is hereby corrected as shown below:

In column 5, line 49: please delete "F(d/dO)" and substitute -- F(d/d0) -- therefor.

In column 5, line 62: please delete "08/069,060" and substitute -- 08/069,606 -- therefor.

In column 6, line 7: please delete "08/069,060" and substitute -- 08/069,606 -- therefor.

Signed and Sealed this

Eighth Day of July, 1997

*Attest:*

BRUCE LEHMAN

*Attesting Officer*      *Commissioner of Patents and Trademarks*